United States Patent
Lofquist et al.

[11] Patent Number: 5,618,909
[45] Date of Patent: Apr. 8, 1997

[54] LIGHT STABILIZED POLYAMIDE SUBSTRATE AND PROCESS FOR MAKING

[75] Inventors: Robert A. Lofquist, Richmond; Yousef Mohajer, Midlothian, both of Va.

[73] Assignee: AlliedSignal Inc., Morristown, N.J.

[21] Appl. No.: 508,194

[22] Filed: Jul. 27, 1995

[51] Int. Cl.$^6$ .......................... C08G 69/08; C08G 73/10
[52] U.S. Cl. .................. 528/310; 528/323; 525/142; 525/175; 525/194; 525/327.6; 525/375
[58] Field of Search .................................. 528/310, 323; 525/142, 175, 194, 327.6, 375

[56] References Cited

U.S. PATENT DOCUMENTS

| | | | |
|---|---|---|---|
| 4,223,147 | 9/1980 | Oertel et al. | 546/224 |
| 4,354,007 | 10/1982 | Scott | 525/370 |
| 4,356,307 | 10/1982 | Kelkenberg et al. | 546/200 |
| 4,743,657 | 5/1988 | Rekers et al. | 525/281 |
| 4,824,884 | 4/1989 | MacLeahy et al. | 524/99 |
| 4,857,595 | 8/1989 | Kazmierzak et al. | 525/142 |
| 4,975,489 | 12/1990 | Kazmierzak et al. | 546/224 |
| 4,981,915 | 1/1991 | MacLeahy et al. | 525/327.6 |

FOREIGN PATENT DOCUMENTS

WO92/12201  7/1992  WIPO.

OTHER PUBLICATIONS

Polymer Degradation and Stability 39 (1993), "Polymer-bound hindered amine light stabilizers for improved weatherability in multi-phase polymer systems", pp. 241–249.

Primary Examiner—James J. Seidleck
Assistant Examiner—Duc Truong
Attorney, Agent, or Firm—Renee J. Rymarz; Melanie L. Brown

[57] ABSTRACT

A dyed or undyed polyamide substrate, preferably film, fiber, or an article manufactured therefrom, with excellent breaking strength retention and ultimate elongation retention, is prepared by reacting a sufficient number of amine and/or amide-forming functional groups of a hindered amine with the end groups of the polyamide precursor(s) at a temperature sufficient for polymerization to occur, to thereby bind the hindered amine to the polyamide and inhibit migration, leaching, and volatilization of the hindered amine. The hindered amine is represented by the formula:

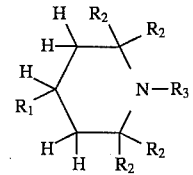

in which
- $R_1$ comprises the amine or amide-forming functional group;
- $R_2$ is alkyl; and
- $R_3$ is selected from the group consisting of hydrogen; alkyl of 1 to 3 carbons; and —$OR_4$ in which $R_4$ is selected from the group consisting of hydrogen, methyl, and alkyl of 1 to 7 carbons.

The light stabilized polyamide substrate has particular utility in flags, decorative banners, and personal flotation device covers.

37 Claims, No Drawings

LIGHT STABILIZED POLYAMIDE SUBSTRATE AND PROCESS FOR MAKING

BACKGROUND OF THE INVENTION

1. Field of the Invention

The present invention relates to a light stabilized polyamide substrate and to a process for making the same. More particularly, this invention relates to a film, fiber, or article made from a polyamide polymer having a specific hindered amine light stabilizer chemically bound thereto during polymerization to thereby enhance light stability, especially when the articles have been dyed with photoreactive chemicals or dyes.

2. Prior Art

It is known to use dyed fabrics woven from organic polymer fibers such as polyamides in flags, decorative banners and as covers for personal flotation devices, such as life preservers. Prolonged exposure to sunlight (weathering) has a tendency to fade the dyed polyamide material and to reduce its physical properties such as strength retention and resistance to elongation. This occurs when the dye and polymer components of the material absorb damaging wavelengths of light.

It is also known to use clear, transparent polyamide films for packaging food and other items. Prolonged exposure of these films to light also reduces physical properties, which is manifested by reduced flexibility, increased opaqueness and crazing, and crumbling.

Various organic light stabilizers are known for use with polymer substrates such as films, fibers and articles manufactured therefrom. One of the more effective organic light stabilizers has been the hindered amine light stabilizer. The two most common methods of incorporating the light stabilizers are by mixing with the pre-formed polymer and by coating, dipping or overspraying the film, fiber or woven Fabric. Many of the commercially available light stabilizers may not have sufficient thermal stability to survive melt incorporation into the polymer or downstream processing, especially with a polyamide such as nylon-6 where processing temperatures may exceed 270° C. Other typical difficulties arising during the melt processing of additives such as UV light stabilizers in polymers include the degradation of polymer molecular weight, volatilization, leaching, extruder screw lubrication and the formation of undesired color. Coating, dipping or overspraying typically requires the stabilizer be applied in solution, dispersion or emulsion form, after the film, fiber or article has been produced. This type of application has the potential advantage of concentrating the stabilizer where it is most effective. However, the solvents and/or other liquids used as carriers for the stabilizer can pose environmental and workplace hazards.

U.S. Pat. No. 4,356,307 discloses the use of cyclic imides which are derivatives of 4-amino-2,2,6,6-tetramethylpiperidine for stabilizing polymers, especially polyolefins, against photo and/or thermal degradation. The stabilizers are incorporated after polymerization by mixing with the pre-formed polymer by techniques conventional in the art, and are thus susceptible to migration, leaching, and volatilization with a concomitant deterioration in stability of the polymer.

Both U.S. Pat. No. 4,354,007 and U.S. Pat. No. 4,743,657 teach methods for preparing polymer bound stabilizer precursor molecules which comprises reacting the molecules with a pre-formed polymer, which can be polyamide, in the presence of a free radical. In the latter reference, the stabilizer precursor molecule contains a reactive double bond which is not readily homopolymerizable, and the stabilizer precursor molecule can be a hindered piperidine. In both references the stabilizer molecules are reacted with a pre-formed polymer and thus require an additional process step.

The concept and utility of using bound stabilizers to control stabilizer location in multi-phase polymer systems, specifically attachment of a hindered piperidine to the rubber and matrix phases of AES terpolymer, has been demonstrated. J. Hahnfeld et al., *Polymer-bound hindered amine light stabilizers for improved weatherability in multi-phase polymer systems,* 39 Polymer Degradation and Stability 241–49 (1993). And PCT WO 92-12201 discloses the addition of UV light stabilizers, e.g., hindered amine light stabilizers, to polymeric compositions prior to the polymerization reaction.

It is therefore advantageous to have an efficient, environmentally friendly process for preparing light stabilized polyamide substrates such as molded objects, films, fibers and fabrics, and in particular flags, decorative banners, and fabric covers for personal flotation devices, wherein the light stabilizer is chemically bound to the polyamide and thus no longer susceptible to migration, leaching, and/or volatilization. It is also advantageous to have a process that utilizes an existing manufacturing process to accomplish one or more of its steps, and particularly advantageous to have a process wherein the light stabilizer readily substitutes functionally for one or more molecular weight regulators currently used during polymerization. The present invention achieves all of this.

SUMMARY OF THE INVENTION

The present invention is a process for preparing a light stabilized polyamide substrate. The process comprises the steps of:

a. mixing an effective amount of a hindered amine with a polyamide precursor, the hindered amine comprising a functional group capable of reacting with an end group of the polyamide precursor and being represented by the formula:

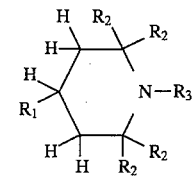

in which $R_1$ comprises the functional group which is an amine or an amide-forming group;

$R_2$ is alkyl, preferably methyl or ethyl; and $R_3$ is selected from the group consisting of hydrogen; alkyl of 1 to 3 carbons; and $-OR_4$ in which $R_4$ is selected from the group consisting of hydrogen, methyl, and alkyl of 1 to 7 carbons; followed by b. reacting the functional group with the end group of the polyamide precursor at a temperature sufficient for polymerization to occur, preferably in the range of from about −15° to about 290° C., more preferably in the range of from about 180° to about 290° C. for nylon substrates and in the range of from about −15° to about 80° C. for aramid substrates, to thereby bind the hindered amine to the polyamide.

The process eliminates the use of hazardous solvents while making efficient use of the light stabilizer which is chemically bound to the polyamide during polymerization as an end group terminator to thereby regulate the molecular weight of the polyamide. A monoamine such as cyclohexylamine is therefore no longer necessary as a terminator. The chemical binding of the light stabilizer to the polyamide also offers the advantages of resistance to migration., leaching, and volatilization. This invention also comprises the products made by this process, most preferably a nylon 6 fiber and articles made therefrom.

The present invention is also a polyamide substrate comprising a light stabilizing amount, preferably about 0.1 to about 1.0, more preferably 0.2 to 0.5 weight percent, of a hindered amine bound thereto by reaction of a functional group of the hindered amine with an end group of a precursor of the polyamide. The hindered amine is represented by the formula:

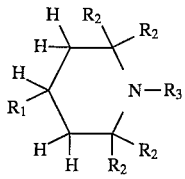

in which $R_1$ comprises the functional group which is an amine or an amide-forming group:

$R_2$ is alkyl, preferably methyl or ethyl; and $R_3$ is selected from the group consisting of hydrogen; alkyl of 1 to 3 carbons; and $—OR_4$ in which $R_4$ is selected from the group consisting of hydrogen, methyl, and alkyl of 1 to 7 carbons.

When the polyamide substrates of this invention are exposed to sunlight after being dyed or treated with a photo-reactive substance (e.g., optical brighteners), the useful life of the substrate is increased by as much as 50% compared to conventional polyamide substrates.

DESCRIPTION OF THE PREFERRED EMBODIMENTS

The present invention comprises the chemical addition of a hindered amine light stabilizer to a polyamide precursor during polymerization of the polyamide polymer. The process essentially comprises the steps of reacting a sufficient number of amine and/or amide-forming functional groups of a preferred hindered amine with the end groups of the polyamide precursor(s) at a temperature sufficient for polymerization to occur, to thereby bind the hindered amine to the polyamide and inhibit migration, leaching, and volatilization of the hindered amine.

The term polyamide as used herein denotes homopolymers, copolymers, blends and grafts of those synthetic long chain polyamides having recurring amide groups as an integral part of the main polymer chain. Exemplary of such polyamides are nylon 6 (polycaprolactam); nylon 6,6 (polyhexamethylene adipamide); nylon 4,6 (poly(tetramethylenediamine-co-adipic acid)); nylon 6,10 (polyhexamethylene sebacamide); nylon 7 (polyenantholactam); nylon 11 (polyaminoundecanamide); nylon 12 (polydodecanolactam), etc. These long chain polyamides are generically referred to as nylons. The term polyamide also denotes the aramids (aromatic polyamides), such as poly(metaphenylene isophthalamide) (NOMEX® fiber, U.S. Pat. No. 3,287,324), and poly(p-phenylene terephthalamide) (KEVLAR® fiber, U.S. Pat. No. 3,671,542).

There are two principal types of nylon polymerization processes, both involving the creation of new amide groups. In nylon polymerizations from dicarboxylic acids and diamines, the carboxyl and the amine end groups of the monomers or the oligomers react with each other to form amide bonds and water (which is subsequently eliminated from the polymer mass). This reaction is called condensation. In polymerization of nylons from lactams, a second type of reaction can also take place, the reaction between an amine end group and the amide link of the lactam monomer to form a longer linear chain. This type of reaction is conventionally called addition. The final stage of this type of polymerization also involves the reaction between carboxyl end groups and amine end groups, i.e., condensation, to form amide bonds and water (which is eliminated from the polymer mass).

In the absence of a controlling agent, the reaction between carboxyl end groups and amine end groups can theoretically continue indefinitely to give a polymer of infinite molecular weight. Controlling agents are agents which react with the carboxyl end groups or amine end groups to form unreactive ends, such as hydrocarbon radicals (e.g., methyl, cyclohexyl, phenyl), or alternatively are agents that react with the end groups to form either all carboxyl end groups or all amine end groups. These controlling agents are conventionally referred to as terminators because they tend to terminate the polymerization. Obviously, the greater the concentration of terminators, the better the control of or the greater the resistance to continued polymerization under virtually anhydrous conditions.

In the polymerization of polyamides, it is well known to add such terminators, e.g., cyclohexylamine, to the polyamide precursor(s) to regulate molecular weight. For nylon 6, it is desirable to regulate molecular weight during polymerization so that further processing can be done without greatly increasing the molecular weight under the nearly anhydrous conditions of the downstream process. The hindered amine used in the process of this invention substitutes for the terminator insofar as it acts as a monofunctional amine in terminating the end groups of the polyamide precursor(s) to thereby control the molecular weight of and, additionally, confer light stability on the polyamide polymer.

The polyamide precursor is preferably selected from the group consisting of lactams, monomers and oligomers of a $C_2$ to $C_{18}$ amino acid; monomers and oligomers of a $C_2$ to $C_{18}$ alkyl diamine with a $C_2$ to $C_{18}$ aliphatic diacid; monomers and oligomers of a $C_2$ to $C_{18}$ alkyl diamine with a $C_8$ to $C_{24}$ aryl diacid or aryl diacid derivative; monomers and oligomers of a $C_6$ to $C_{24}$ aryl diamine with a $C_8$ to $C_{24}$ aryl diacid or aryl diacid derivative; monomers and oligomers of a $C_6$ to $C_{24}$ aryl diamine with a $C_2$ to $C_{18}$ alkyl diacid or alkyl diacid derivative; monomers and oligomers of a $C_8$ to $C_{14}$ aralkyl diamine with a $C_{10}$ to $C_{14}$ aralkyl diacid or diacid derivative; and copolymers thereof. Exemplary $C_2$ to $C_{18}$ amino acids are aminocaproic acid, polyaminocaproic acid, and 11 aminoundecanoic acid. Exemplary $C_2$ to $C_{18}$ alkyl diamines are butane diamine, hexamethylene diamine and dodecanediamine. Exemplary $C_2$ to $C_{18}$ aliphatic diacids are adipic acid, sebacic acid, and decanedicarboxylic acid. Exemplary $C_8$ to $C_{24}$ aryl diacids or aryl diacid derivatives are terephthalic and isophthalic acids. Exemplary $C_6$ to $C_{24}$ aryl diamines are para-phenylenediamine and meta-phenylene diamine. Exemplary $C_8$ to $C_{14}$ aralkyl diamines are meta-xylylenediamine and para-xylylenediamine. Exemplary $C_{10}$ to $C_{14}$ aralkyl diacids or diacid derivatives are phenylenediacetic acid isomers.

The most preferred linear polyamide polymer is nylon 6 wherein the polyamide precursors are caprolactam and aminocaproic acid with carboxyl and amine end groups. For the aramid polymers, the polyamide precursor preferably is either (1) an aryl diamine with an acid halide, and the end groups are selected from the group consisting of carboxylic acid derivatives, amines, and combinations thereof, or (2) an aryl diamine salt with an acid halide, and the end groups are selected from the group consisting of amine salts, amines, carboxylic acid derivatives, and combinations thereof. The preferred acid halides are terephthaloyl chloride and isophthaloyl chloride.

The hindered amine is represented by the formula:

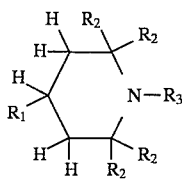

in which $R_1$ comprises the amine or amide-forming functional group;

$R_2$ is alkyl, preferably a methyl or ethyl group, more preferably the former; and $R_3$ is selected from the group consisting of hydrogen; alkyl of 1 to 3 carbons; and —$OR_4$ in which $R_4$ is selected from the group consisting of hydrogen, methyl, and alkyl of 1 to 7 carbons. $R_4$ most preferably is hydrogen.

$R_1$, the amine or amide-forming functional group, is preferably selected from the group consisting of —(NH)$R_5$ where $R_5$ is hydrogen or alkyl of 1 to 8 carbons; carboxyl; carboxylic acid derivative; —(CH$_2$)x(NH)$R_5$, in which X is an integer of from 1 to about 6 and $R_5$ is hydrogen or alkyl of 1 to 8 carbons; —(CH$_2$)$_y$COOH, in which Y is an integer of from 1 to about 6; and —(CH$_2$)$_y$COOH acid derivative in which Y is an integer of from 1 to about 6. Most preferably $R_1$ is —NH$_2$, —COOH, or —COOH acid derivative.

The preferred hindered amine is 4-amino-2,2,6,6-tetramethylpiperidine, commercially available from Huls America, Inc. This light stabilizer is soluble in a molten polymer precursor, e.g., caprolactam for nylon 6, or an aqueous solution of polymer precursor, e.g., hexamethylenediamine adipate for nylon 6,6. The functional group of the hindered amine reacts with the polyamide end group to thereby regulate the molecular weight. The amount of the hindered amine utilized is sufficient to achieve light stabilization of the polyamide substrate. The preferred amount utilized ranges from about 0.1 to about 1, more preferably about 0.2 to about 0.5, weight percent based on the weight of the polyamide substrate.

Reaction temperatures for nylon polymerizations are in a range of from about 180° C. to about 290° C., more preferably in a range of from about 225° to about 280° C. For the aramids, reaction temperatures are in a range of from about —15° to about 80° C., more preferably from about –15° to about 30° C.

Delusterants are typically added to opacify nylon substrates. Anatase titanium dioxide, one of the better known delusterants for use with nylons, sensitizes the substrate to light. To counteract this, copper salts, manganous salts, and additives such as hypophosphorous acids, phosphites, and phosphates, are frequently added as light stabilizers. See accompanying Examples 4–7, 12 and 14, where a manganese salt is utilized. The hindered amine utilized in the present invention eliminates the need for the manganese salt as a light stabilizer when anatase titanium dioxide delusterant is incorporated during polymerization.

Products made in accordance with the process of the present invention have a multitude of uses. Applications where weathering or exposure to sunlight are a major concern include, by way of example, outdoor clothing, interior automotive fabrics, marine fabrics, marine slings, marine ropes, cordage, agricultural fabrics, awnings, tarps, canopies, tents, flags, banners, outdoor furniture, sports equipment, personal flotation devices, sails, parachutes, soft-sided luggage, geotextiles, animal control webbings, cargo tie-downs/covers, boat covers, deck covers, industrial lifting slings, military webbings, parachute harnesses, mailbags, drapes, seat belt webbing, exterior automotive molded parts.

The invention will be described for polyamide fibers and films, primarily nylon 6 fibers such as commercially available from AlliedSignal Inc. and films. However, the polyamide substrate can additionally include molded objects and articles manufactured from polyamide fibers, e.g., fabrics (woven, nonwoven, and knitted), and the like. The preferred polyamide substrates are fabrics made from nylon 6 fibers having a denier per filament of up to about 20, more preferably in the range of about 7 and below. The invention has greater effect as the denier per filament of the fibers decreases due to the greater surface to volume ratio.

Further details on polymerization conditions can be found in the examples which follow. Reference should also be had to U.S. Pat. Nos. 2,071,150, 2,071,253, 2,130,523, 2,130,948, 3,287,324, and 3,671,542, which describe the preparation of nylons and aramids, and all of which are hereby incorporated by reference. A high speed process for making fiber from nylon 6 is also set forth in U.S. Pat. No. 4,237,187, also incorporated by reference. See also the Encyclopedia of Polymer Science and Engineering, 2d Edition, Volume 11, relating to Polyamides (1988).

In the accompanying Examples 1 through 14, the yarn was knitted into sleeves approximately 3 yards in length using a Carolina Lab Knitter Model LK-100 with the following conditions: single end, 50 gauge, 240 needles, 3.5 inch diameter, tight knit. Several sleeves were sewn together into a continuous rope and loaded into a low ratio dye beck (Liberty Machine Company) where both ends of the rope were sewn together to form a typical rope configuration for beck dyeing. Chemicals employed during scouring included Triton X-100, a nonionic surfactant manufactured by Rohm & Haas Chemical Company, at 1.0% on weight of fabric (hereafter owf), and trisodium phosphate, an alkaline pH control agent generically manufactured, charged to the scour bath to yield a pH range of about 9.0 to 9.5. Targeted water ratio of the load was 30 to 1 based on the weight of fabric. The scour cycle was run at a turnover rate of 30 to 90 seconds with a temperature upramp of six degrees Fahrenheit per minute. The beck was held for 60 minutes when the bath reached 180° F. After this hold time the kettle was drained and the fabric rinsed with fresh water for 2–3 minutes. The fabric was subsequently centrifuged and convection dried prior to dyeing. Thereafter the rope of sleeves was split into sections approximately 24 inches in length for dyeing. Dyeing was performed on an Ahiba Texomat, a bench scale batch dyeing apparatus. Chemicals used included Cenegen NWA, an alkaryl-ethoxy condensate leveling agent from Crompton & Knowles Corporation, at 1.0% owf, and ammonium sulfate, a generically produced acid generator and pH buffering agent at 2.5% owf. Starting pH was recorded at 6.2 Each 24 inch sleeve section was loaded into individual 400 ml Texomat beakers and agitated 10 minutes cold in the dyeing chemical bath prior to charging of the dyestuffs. After 10 minutes in this prewet cycle 1/1000 stock solution dyes were added directly to the Ahiba beaker and the machine allowed to run cold for 5 additional minutes. Total dyebath ratio was 30 to 1 owf. The temperature was then allowed to ramp to the boil at 2 degrees per minute and held there for 30 minutes. Cold water was then charged to the Texomat to cool the beakers to 120° F. and the samples were removed, rinsed, extracted and convection dried.

In accompanying examples 1 through 14, the dyes employed included Acidol Brilliant Yellow 8GX-N (C.I.A.Y. 184, manufactured by BASF Corp.) at 0.10% owf, and Orcoacid Rhodamine B (400%) (C.I.A.R. 52, manufactured by Organic Dyestuffs) at 0.10% owf. Mock dyeing was performed with dyebath chemicals only and run equivalent to a normal dye cycle.

For weathering and testing, a portion of the knitted section was deknitted, wound around a 10 gauge rectangular aluminum plate approximately 3"×6" and exposed to the light of a carbon arc in a weatherometer in accordance with ASTM G23-90. After 100 hours exposure the breaking strength of the yarn was measured (see below), and compared to the strength of the dyed but unexposed yarn to determine the residual breaking strength of the yarn.

Certain processes and tests utilized in illustrating the invention are defined below:

The relative viscosity in formic acid of the polymer was determined by dissolving 5.5 g of the polymer in 50 ml of 90% formic acid. The flow times of this solution in a viscometer at 25° C. were compared to the flow times of pure 90% formic acid through the same viscometer tube (ASTM D-789-62 T).

The carboxyl content of nylon was measured by dissolving 2 g of polymer in 50 ml of benzyl alcohol at 180°–190° C. This solution was titrated with 0.05N potassium hydroxide in benzyl alcohol, using phenolphthalein as an indicator. The carboxyl content is conventionally reported as equivalents per $10^6$ grams of polymer. In the examples we use meq/kg, which is numerically identical.

The amine content of nylon was measured by dissolving 1 g of polymer in 50 ml of a 68/32 phenol/methanol mixed solvent at room temperature and titrating with 0.01N p-toluenesulfonic acid in methanol, using a mixed green indicator (0.5 g methyl yellow and 0.5 g methylene blue in 100 cc of methanol). The end point is reached when the color changes from green to gray. The amine content is conventionally reported as equivalents per $10^6$ grams of polymer. In the examples we use meq/kg, which is numerically identical.

Tensile testing for the nylon 6 yarn in Examples 1 through 14 (ultimate elongation and breaking strength) was done in accordance with ASTM 2256 using an Instron CRE (Constant Rate Elongation) Tester, 120% per minute extension rate, 5 inch gauge length, 12 inch cross-head Tensile testing of the aramid yarns of Examples 14 through 18 did not occur, but it is anticipated that the same test method and equipment would be used with a 100% per minute extension rate, a 10 inch gauge length, and 12 inch cross-head. Tensile testing for the unweathered film of Example 19 (tensile modulus; tensile yield, psi and elongation, %; tensile strength; tensile elongation) was done in accordance with ASTM D882. Elmendorf tear and Graves tear were measured in accordance with, respectively, ASTM D1922 and ASTM D1004. All of the foregoing test methods are hereby incorporated by reference.

The following examples are presented to provide a more complete understanding of the invention and are not to be construed as limitations thereon.

EXAMPLE 1 (COMPARATIVE)

1520 grams of caprolactam, 0.15 grams of a 50% solution of hypophosphorous acid, 2.15 grams of acetic acid and 3.54 grams of cyclohexylamine were heated to 80° C. and poured into a 3-liter reactor equipped with an electrical heating mantle and an agitator. 80 grams of 6-aminocaproic acid were added and the mixture was heated to 255° C. over a 2 hour period under a nitrogen sweep. The mixture was held at this temperature with agitation for 8 hours, after which the polymer was extruded from the bottom of the reactor, chopped into pellets, leached in hot water to remove residual caprolactam and low molecular weight oligomers, and then dried. Analysis of the polymer showed a relative formic acid viscosity (hereafter FAV) of 44.4, with 40 milliequivalents per kilogram of (hereafter meq/kg) carboxyls (COOH) and 18 meq/kg amines ($NH_2$). These values are set forth in Table 1 below.

This polymer was spun with a take-up of 3800 meters per minute into a 200 denier/32 filament yarn, using spinnerets having 16 round orifices (0.018 inch in diameter and 0.069 inch long), and quenched with an air gap of about 16 feet at 20° to 25° C. prior to take-up. Similar yarn is commercially available from AlliedSignal Inc. as 200 denier bright nylon. This yarn was knitted into a sleeve using the equipment and conditions set forth previously.

One section was dyed yellow using the equipment and conditions previously set forth. A portion of the dyed, knitted section was deknitted, weathered and tested, all as set forth above. After 100 hours exposure the breaking strength of the yarn was measured, and compared to the strength of the dyed but unexposed yarn. The residual breaking strength was found to be 30% of the original strength. This value is also set forth in Table 1.

EXAMPLE 2

1520 grams of caprolactam, 0.15 grams of a 50% solution of hypophosphorous acid, 5.0 grams of 4-amino-2,2,6,6-tetramethylpiperidine (hereafter "triacetonediamine" and TADA in Table I), commercially available from Huls America, Inc., of Germany, were heated to 80° C. and poured into a 3-liter reactor equipped with an electrical heating mantle and an agitator. 80 grams of 6-aminocaproic acid were added and the mixture was heated to 255° C. over a 2 hour period under a nitrogen sweep. The mixture was held at this temperature with agitation for 4 hours, after which the polymer was extruded from the bottom of the reactor, chopped into pellets, leached in hot water to remove residual caprolactam and low molecular weight oligomers, and then dried. This polymer was spun into yarn which was then knitted, cut, dyed and tested, all as in Example 1. Percent breaking strength retained and polymer analysis values are set forth in Table 1.

EXAMPLE 3

The procedure of Example 2 was repeated with the following change: 7 grains of the triacetonediamine were used. Percent breaking strength retained and polymer analysis values are set forth in Table 1.

EXAMPLE 4 (COMPARATIVE)

1520 grams of caprolactam, 0.15 grams of a 50% solution of hypophosphorous acid, 1.72 grams of a 50% dispersion of titanium dioxide ($TiO_2$), 2.6 grams of acetic acid and 0.06 grams of manganous chloride tetrahydrate ($MnCl_2$) heated to 80° C. and poured into a 3-liter agitated reactor. 80 grams of 6-aminocaproic acid were added and the mixture was heated to 255° C. over a 2-hour period. The mixture was held at this temperature with agitation for 3.5 hours, after which the polymer was extruded from the bottom of the reactor, chopped into pellets, leached in hot water to remove residual caprolactam and low molecular weight oligomers, and then dried. This polymer was spun into yarn which was then knitted, cut, dyed and tested, all as in Example 1. In addition, the ultimate elongation of the yarn was measured and compared to that of the dyed but unexposed yarn to give the percent ultimate elongation (hereafter U.E.) retained.

Yet another section was dyed red using the equipment and conditions previously set forth. A portion of the dyed, knitted section was deknitted, weathered and tested, all as set forth above. After 100 hours exposure the breaking strength of the yarn was measured, and compared to the strength of the dyed but unexposed yarn. Similarly, the U.E. of the yarn was measured and compared to that of the dyed but unexposed yarn to give the percent U.E. retained.

Yet another section was mock dyed using the equipment and conditions previously set forth. A portion of the mock dyed, knitted section was deknitted, weathered and tested, all as set forth above. After 100 hours exposure the breaking strength of the yarn was measured, and compared to the strength of the mock dyed but unexposed yarn. Again, the U.E. of the yarn was measured and compared to that of the mock dyed but unexposed yarn to give the percent U.E. retained.

Percent breaking strength retained (residual breaking strength), percent U.E. retained, and polymer analysis values are set forth in Table 1.

EXAMPLE 5

Example 4 was repeated with the following changes: 2.0 grams of the 50% dispersion of $TiO_2$ were used, and 3.0 grams of the triacetonediamine were substituted for the acetic acid. Percent breaking strength retained (residual breaking strength), percent U.E. retained, and polymer analysis values are set forth in Table 1.

EXAMPLE 6

Example 5 was repeated with the following changes: the amount of the triacetonediamine was increased to 5.0 grams, and the mixture was held with agitation for 4 hours. Percent breaking strength retained (residual breaking strength), percent U.E. retained and polymer analysis values are set forth in Table 1.

EXAMPLE 7

Example 5 was repeated with the following changes: the amount of the triacetonediamine was increased to 7.0 grams, and the mixture was held with agitation for 8.5 hours. Percent breaking strength retained (residual breaking strength), percent U.E. retained and polymer analysis values are set forth in Table 1.

EXAMPLE 8

Example 5 was repeated with the following changes: no manganous chloride tetrahydrate was included in the batch make-up, and the mixture was held with agitation for 4 hours. Percent breaking strength retained (residual breaking strength), percent U.E. retained and polymer analysis values are set forth in Table 1.

EXAMPLE 9

Example 5 was repeated with the following changes: the amount of the triacetonediamine was increased to 7.0 grams, and no manganous chloride tetrahydrate was included in the batch make-up. Percent breaking strength retained (residual breaking strength), percent U.E. retained and polymer analysis values are set forth in Table 1.

EXAMPLE 10 (COMPARATIVE)

1520 grams of caprolactam, 0.15 grams of a 50% solution of hypophosphorous acid, 1.72 grams of a 50% dispersion of $TiO_2$, and 2.6 grams of acetic acid (added as a molecular weight regulator) were heated to 80° C. and poured into a 3-liter agitated reactor. There was no triacetonediamine stabilizer in the mixture. 80 grams of 6-aminocaproic acid were added and the mixture was heated to 255° C. over a 2-hour period. The mixture was held at this temperature with agitation for about 3.5 hours, after which the polymer was extruded from the bottom of the reactor, chopped into pellets, leached in hot water to remove residual caprolactam and low molecular weight oligomers, and then dried. This polymer was spun and made into sleeves which were cut into sections, dyed and exposed to carbon arc as in the previous examples. Percent breaking strength retained (residual breaking strength), percent U.E. retained and polymer analysis values are set forth in Table 1.

EXAMPLE 11 (COMPARATIVE)

Example 10 was repeated with the following change: the 50% dispersion of $TiO_2$ was increased to 8.6 grams. Percent breaking strength retained (residual breaking strength), percent U.E. retained and polymer analysis values are set forth in Table 1.

EXAMPLE 12 (COMPARATIVE)

Example 11 was repeated with the following change: 0.06 grams of manganous chloride tetrahydrate was included in the batch makeup. Percent breaking strength retained (residual breaking strength), percent U.E. retained and polymer analysis values are set forth in Table 1.

EXAMPLE 13

Example 5 was repeated with the following changes: the amount of triacetonediamine was increased to 5.0 grams, the 50% dispersion of $TiO_2$ was increased to 8.6 grams, and no manganous chloride tetrahydrate was included in the batch makeup. Percent breaking strength retained (residual breaking strength), percent U.E. retained and polymer analysis values are set forth in Table 1.

EXAMPLE 14

Example 13 was repeated with the following changes: 0.06 gram of manganous chloride tetrahydrate was included in the batch makeup. Percent breaking strength retained (residual breaking strength), percent U.E. retained and polymer analysis values are set forth in Table 1.

EXAMPLE 15 (COMPARATIVE)

Example 2 of U.S. Pat. No. 3,671,542, hereby incorporated by reference, illustrates a conventional method of producing an aramid by the preparation of the unmodified polymer, an anisotropic dope, and fibers from this dope. This example is substantially repeated, as follows. Polymer Preparation: Powdered terephthaloyl chloride (101.55 g., 0.5 mole) is added to a solution of p-phenylenediamine (54.0 g., 0.5 mole) in a mixture of hexamethylphosphoramide (600 ml.) and N-methyl-2-pyrrolidone (300 ml.) and stirred at high speeds in a blender. A solid mass is obtained within 5 minutes. After 20 minutes, the mass is combined with water and stirred at high speeds in a gallon size (3.785 liter) blender. The polymer is washed four times with water, once with alcohol, and finally with acetone by being stirred in a blender and isolated by being filtered on a Buchner funnel. The polymer is dried overnight in a vacuum oven at about 100° C. The yield of polymer is 116 g. (97.5 percent of theoretical). The inherent viscosity, measured as a solution of 125 mg. polymer in 25.0 ml. of 95–98 percent (by weight) sulfuric acid, is 3.8.

Anisotropic Dope Preparation: A mixture of 50.0 g. of the above polymer and 450.0 g. of fuming (0.8 percent free $SO_3$) sulfuric acid is mixed anhydrously with an air-driven disc-type stirrer in a 500-ml. resin-making kettle while cooling with an ice/water bath. The mixture is stirred overnight during which time the cooling bath is allowed to warm to room temperature. The resulting dope exhibits stir-opalescence and depolarizes plane polarized light. It exhibits a solution viscosity at room temperature of 5000 poise, measured by a Brookfield (model RVF) viscometer employing a No. 7 spindle, at a spindle rate of 2 r.p.m.; at a rate of 20 r.p.m. the dope exhibits a solution viscosity of only 1,660 poise.

Fiber Preparation by Wet Spinning: The spin dope prepared above is centrifuged to remove entrapped air. It is then extruded at the rate of about 0.8 ml./min. under a pressure of 370 lb/in$^2$ (26 kg/cm$^2$) through a 0.025 in. (0.064 cm.) thick precious metal spinneret having 20 holes of 0.002 in. (0.0051 cm.) diameter into an aqueous coagulating bath maintained at 43° C. The bath is about 16 in. (40 cm.) wide, 5.5 in. (14 cm.) deep and 37 in. (94 cm.) long with stainless steel rollers placed about 2 ft. (0.61 m.) from each other. The yarn is drawn through the bath and around the rollers such that it makes three passes through the water bath. It is then snubbed out of the bath at about a 45° angle to an electrically driven windup device. The yarn is collected on a perforated bobbin at 27 ft./min. (8.24 m/min.) while being wetted on the bobbin by passing through a water reservoir located at the lower portion of the collection bobbin. It is then washed in cool running water overnight and a portion is removed for heat treatment. The remainder is dried on the bobbin in air at room temperature.

Heat Treatment of Wet Fibers: The wet (washed) yarn prepared above is passed at 25 ft./min. (7.63 m/min.) through a tube [Device B] heated to 500° C. and collected at 26.5 ft./min. (8.09 m/min.).

The resulting filaments are expected to exhibit high initial modulus (e.g., greater than about 800 grams per denier), high tensile strength (e.g., greater than about 12 grams per denier), and low elongation (e.g., less than about 2%).

EXAMPLE 16

Example 15 is repeated with the following modification. During polymer preparation, the solution to which the powdered terephthaloyl chloride is added includes 4-amino-2,2,6,6-tetramethylpiperidine (0.20 g., 0.00168 mole) as a light stabilizer.

Initial modulus, tensile strength, and elongation values for the resulting filaments are expected to be comparable to those of Example 15. The fibers of this example, however, are expected to have improved resistance to light degradation compared to the fibers of Comparative Example 15, as would be evidenced by improved breaking strength retention.

EXAMPLE 17 (COMPARATIVE)

Example 7 of U.S. Pat. No. 3,287,324, hereby incorporated by reference, illustrates a conventional method of producing a solution-spinnable aramid, including the preparation of a solution of the polymer and the spinning of a fiber from this solution. This example is substantially repeated, as follows.

Meta-phenylene diamine dihydrochloride in the amount of 5.4 parts is placed in a reaction vessel fitted with a high speed stirrer and a solution of 12.1 parts of triethylamine in 200 parts methylene chloride is added rapidly. The mixture is stirred for one minute to dissolve the diamine salt. Triethylamine hydrochloride is formed in situ. 6.1 pans of isophthaloyl chloride in 200 pans of methylene chloride are then added. Polymerization is completed and α MPD-I is precipitated by addition of a volume of hexane about equal to the volume of the reaction mass. The product is water-white and has an inherent viscosity of 1.71. It is obtained in 91% yield.

A blend of several polymers in the α form prepared by the procedure outlined above is dissolved to a concentration of 17% in a mixture of 95 parts dimethylformamide and 5 pans lithium chloride. This solution at 128° C. is spun through a 5-hole spinneret, in which each orifice has a diameter of 0.10 min., into an air column maintained at 225° C. Fiber, wound up at the rate of 92 yards per minute is thereafter drawn to 4.00 times its original length and boiled off in water to remove the salt. The final fiber, β MPD-I, has a tenacity of 3.8 grams per denier, with a 39% elongation at the break.

The resulting filaments are expected to exhibit a tenacity of about 4 grams per denier and an elongation of about 30%.

EXAMPLE 18

Example 17 is repeated with the following modification. 0.015 g. of 4-amino-2,2,6,6-tetramethylpiperidine hydrochloride is placed in the reaction vessel with the meta-phenylenediamine dihydrochloride for polymerization and solution spinning. Tenacity and elongation values for the resulting filaments are expected to be comparable to those of Example 17. The fibers of this example, however, are expected to have improved resistance to light degradation compared to the fibers of Example 17, as would be evidenced by improved breaking strength retention.

EXAMPLE 19 (COMPARATIVE)

A 1-mil film was made by melting polymer pellets similar to those described in Comparative Example 1 and sending the molten polymer through a 2" extruder with a 24 to 1 L/D, made by Sterling Extruder Corporation. The extruder temperature in the feed zone was about 220° C., with a mid-zone temperature of about 246° to 248° C. and a final zone temperature of about 260° C. The extruder speed was about 25 rpm, and the head pressure was about 400 psi. The molten polymer was fed into a film die, at 260° C., having a 14" by 0.025" exit. The pressure at the die was about 500 psi. This die is capable of forming a film up to 12" wide, before bead removal, and up to 10 mils in thickness. A thicker film gives handling problems such as wrinkles and droops in the film. The extrudate from the die, after passing through a 0.5" air gap, was taken up on a casting roll at about 60° C., passed around an idler roll and a cooling roll, past edge knives to remove the beads at the edges of the film, then onto a take-up roll. The 1-mil thick film was colorless and transparent. The tensile properties and tear of the undrawn film were measured. The film is weathered generally in accordance with ASTM G23-90 for 100 hours. It is anticipated that the tensile property values will decline significantly upon weathering.

EXAMPLE 20

The procedure of Comparative Example 19 is repeated utilizing polymer pellets similar to those described in Example 2, i.e., containing about 0.35 weight % triacetone diamine, to make a 1-mil thick, light stabilized nylon-6 film. It is anticipated that the tensile properties and tear values of this undrawn film, upon weathering, will be significantly improved compared to the weathered samples obtained in Comparative Example 19.

EXAMPLE 21 (COMPARATIVE)

A 3-mil film was made on the same equipment as that of Comparative Example 19 by speeding the extruder speed to about 30 rpm and adjusting the speeds of the take-up rolls. The film, which was colorless and transparent, was then drawn, monoaxially, using a draw roll heated to about 100° C., and a heat-set roll at about 110° C., using a machine ratio, draw roll speed to feed roll speed, of 2.96, to give a drawn film about 1 mil in thickness. Tensile properties and tear values are obtained before and after weathering of the film. It is anticipated that weathering will cause a significant decline in these values.

EXAMPLE 22

The procedure of Comparative Example 21 is repeated utilizing polymer pellets similar to those described in Example 2, i.e., containing about 0.35 weight % triacetone diamine, to make a drawn 1-mil thick, light stabilized nylon-6 film. Tensile properties and tear are measured for the film of this example before and after weathering. It is anticipated that the values obtained in this example after weathering will be significantly superior to the weathered samples of Comparative Example 21. Films made in accordance with this example are expected to remain clear, to resist crazing, and to retain physical properties (e.g., flexibility) for a longer time period after exposure to sunlight.

Discussion

A comparison of Examples 1 through 3 shows that the incorporation of the hindered amine light stabilizer, 4-amino-2,2,6,6-tetramethylpiperidine (triacetonediamine), at levels of about 0.2 to about 0.5 weight %, more than doubled the residual breaking strength and retained ultimate elongation of a dyed nylon 6 fiber alter exposure to carbon arc light.

In Examples 4 through 14, the polymer included titanium dioxide as a delustrant, which is known to adversely impact breaking strength retention in nylon 6 (see comparative Examples 10 and 11). Manganous chloride tetrahydrate is commonly used as a light stabilizer in nylon containing titanium dioxide—compare comparative Example 12 with comparative Examples 10 and 11. A comparison of Examples 4 and 5, where the batch included both $TiO_2$ and the manganese light stabilizer, shows that the incorporation of the triacetonediamine approximately doubled the residual breaking strength of the dyed nylon 6 fiber after exposure to carbon arc light. In Examples 5, 6 and 7, where the amount of the triacetonediamine was increased from 0.21 to 0.35 to 0.49 weight %, respectively, the dyed nylon 6 fibers containing $TiO_2$ were significantly protected by as little as 0.21 weight percent of the stabilizer. In mock-dyed fibers, increased levels of the triacetonediamine appeared to be useful. Examples 8, 9 and 10 demonstrate that, even in the absence of the manganese light stabilizer, the triacetonediamine surprisingly provided significant stabilization to the delustered nylon 6. Comparison of Examples 11 (comparative), 12, 13 and 14 shows that the triacetonediamine was effective in nylon 6 fiber even at high levels of the delustrant and without the manganese light stabilizer.

These relative breaking strengths demonstrate that the incorporation of the triacetonediamine stabilizer greatly increases the breaking strength of dyed and mock dyed nylon 6 fiber and therefore the expected life of a fabric (e.g., dyed flags, banners, fabrics or ropes) or of an article made therefrom.

The same degree of improvement was found for ultimate elongation, which is indicative of the flexibility remaining in the fiber, and hence of the useful life of the article made therefrom.

TABLE 1

| | | | | | | | | | | | | | |
|---|---|---|---|---|---|---|---|---|---|---|---|---|---|
| | | | | | | Light Stability Data for Nylon 6 Fiber | | | | | | | |
| | Polymer analyses | | | Additives | | | Yarn | Percent Strength Retained | | | Percent UE Retained. | | |
| Ex. | FAV | COOH | $NH_2$ | TADA | $TiO_2$ | $MnCl_2$ | Denier | Yellow | Red | Mock-dyed | Yellow | Red | Mock-dyed |
| 1* | 44.4 | 40.5 | 18 | 0 | 0 | 0 | 105 | 30 | | | | | |
| 2 | 64.7 | 27 | 67.4 | 0.35 | 0 | 0 | 103 | 76 | | | | | |
| 3 | 49.6 | 22.6 | 80.5 | 0.49 | 0 | 0 | 100 | 63 | | | | | |
| 4* | 49.3 | 55.8 | 32.6 | 0 | 0.06 | Yes | 101 | 38.3 | 34.2 | 36.9 | 29.4 | 24.7 | 28.4 |
| 5 | 45.6 | 41.5 | 64.7 | 0.21 | 0.07 | Yes | 101 | 70.3 | 63.4 | 59.9 | 59.4 | 47.2 | 47.5 |
| 6 | 53.4 | 36 | 68.3 | 0.35 | 0.07 | Yes | 101 | 67.4 | 66 | 48.4 | 57.1 | 59.2 | 42.1 |
| 7 | 51.3 | 18.7 | 71.1 | 0.49 | 0.07 | Yes | 101 | 72.6 | 72.4 | 84.8 | 69.4 | 63.6 | 78.5 |
| 8 | 54 | 38.4 | 59.8 | 0.21 | 0.07 | 0 | 100 | 60 | 59.3 | 45.2 | 49.5 | 51.2 | 33.2 |
| 9 | 50 | 24.1 | 75.5 | 0.49 | 0.07 | 0 | 99 | 66.3 | 68.5 | 60.8 | 52.8 | 56.9 | 50.6 |
| 10* | 52.6 | 47.4 | 20.5 | 0 | 0.06 | 0 | 100 | 17.4 | 16.5 | 24.6 | 8.9 | 9.8 | 15.9 |
| 11* | 59.4 | 43.9 | 58.2 | 0 | 0.3 | 0 | 100 | 15.5 | 14.4 | 14.6 | 10.2 | 8.7 | 10.1 |
| 12* | 46.6 | 52.6 | 32.7 | 0 | 0.3 | Yes | 100 | 48.8 | 36.9 | 40.4 | 38.8 | 29.7 | 31.9 |
| 13 | 45.5 | 33.7 | 72 | 0.35 | 0.3 | 0 | 101 | 54 | 43.8 | 59.7 | 43.6 | 36.2 | 46.5 |
| 14 | 56.6 | 20 | 71.6 | 0.35 | 0.3 | Yes | 101 | 64.1 | 56.5 | 68.5 | 55.8 | 53.1 | 58.5 |

*Comparative Examples
Yes = 10 ppm Mn

We claim:
1. A process for preparing a light stabilized polyamide substrate, comprising the steps of:
 a. mixing an effective amount of a hindered amine with a polyamide precursor, said hindered amine comprising a functional group which reacts with an end group of said polyamide precursor and being represented by the formula:

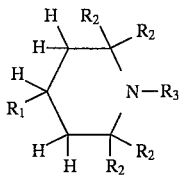

in which
 $R_1$ comprises said functional group which is an amine or an amide-forming group; $R_2$ is alkyl; and
 $R_3$ is selected from the group consisting of hydrogen; alkyl of 1 to 3 carbons; and —$OR_4$ in which $R_4$ is selected from the group consisting of hydrogen, methyl, and alkyl of 1 to 7 carbons; followed by
 b. reacting said functional group with the end group of said polyamide precursor at a temperature sufficient for polymerization to occur, to thereby bind the hindered amine to the polyamide.

2. The process of claim 1 wherein said polyamide precursor is selected from the group consisting of lactams; monomers and oligomers of a $C_2$ to $C_{18}$ amino acid; monomers and oligomers of a $C_2$ to $C_{18}$ alkyl diamine with a $C_2$ to $C_{18}$ aliphatic diacid; monomers and oligomers of a $C_2$ to $C_{18}$ alkyl diamine with a $C_8$ to $C_{24}$ aryl diacid or aryl diacid derivative; monomers and oligomers of a $C_6$ to $C_{24}$ aryl diamine with a $C_8$ to $C_{24}$ aryl diacid or aryl diacid derivative; monomers and oligomers of a $C_6$ to $C_{24}$ aryl diamine with a $C_2$ to $C_{18}$ alkyl diacid or alkyl diacid derivative; monomers and oligomers of a $C_8$ to $C_{14}$ aralkyl diamine with a $C_{10}$ to $C_{14}$ aralkyl diacid or diacid derivative; and copolymers thereof.

3. The process of claim 1 wherein a sufficient amount of said hindered amine is mixed with said polyamide precursor to achieve about 0.1 to about 1 weight percent hindered amine based on the weight of the polyamide substrate.

4. The process of claim 1 wherein said temperature is in a range of from about −15° to about 290° C.

5. The process of claim 1 wherein $R_1$ is selected from the group consisting of —(NH)$R_5$ where $R_5$ is hydrogen or alkyl of 1 to 8 carbons; carboxyl; carboxylic acid derivative; —(CH$_2$)$_x$(NH)$R_5$, in which X is an integer of from 1 to about 6 and $R_5$ is hydrogen or alkyl of 1 to 8 carbons; —(CH$_2$)$_y$COOH, in which Y is an integer of from 1 to about 6; and —(CH$_2$)$_y$COOH acid derivative in which Y is an integer of from 1 to about 6.

6. The process of claim 5 wherein $R_2$ is a methyl group.
7. The process of claim 5 wherein $R_3$ is —H.
8. The process of claim 5 wherein said hindered amine is 4-amino-2,2,6,6-tetramethylpiperidine.
9. The process of claim 5 wherein said polyamide precursor is selected from the group consisting of lactams; monomers and oligomers of a $C_2$ to $C_{18}$ amino acid; monomers and oligomers of a $C_2$ to $C_{18}$ alkyl diamine with a $C_2$ to $C_{18}$ aliphatic diacid; monomers and oligomers of a $C_2$ to $C_{18}$ alkyl diamine with a $C_8$ to $C_{24}$ aryl diacid or aryl diacid derivative; monomers and oligomers of a $C_6$ to $C_{24}$ aryl diamine with a $C_8$ to $C_{24}$ aryl diacid or aryl diacid derivative; monomers and oligomers of a $C_6$ to $C_{24}$ aryl diamine with a $C_2$ to $C_{18}$ alkyl diacid or alkyl diacid derivative; monomers and oligomers of a $C_8$ to $C_{14}$ aralkyl diamine with a $C_{10}$ to $C_{14}$ aralkyl diacid or diacid derivative; and copolymers thereof.

10. The process of claim 5 wherein said polyamide precursors are caprolactam and aminocaproic acid, the polyamide substrate is nylon 6, and the end groups are carboxyls and amines.

11. The process of claim 5 wherein said polyamide precursor is an aryl diamine with an acid halide; the polyamide substrate is an aramid; and the end groups are selected from the group consisting of carboxylic acid derivatives, amines, and combinations thereof.

12. The process of claim 11 wherein said acid halide is terephthaloyl chloride.

13. The process of claim 5 wherein said polyamide precursor is an aryl diamine salt with an acid halide; the polyamide substrate is an aramid; and the end groups are selected from the group consisting of amine salts, amines, carboxylic acid derivatives, and combinations thereof.

14. The process of claim 13 wherein said acid halide is isophthaloyl chloride.

15. The process of claim 5 wherein said temperature is in a range of from about −15° to about 290° C.

16. The process of claim 15 wherein said temperature is in a range of from about 225° to about 280° C.

17. A product made in accordance with the process of claim 5.

18. A product made in accordance with the process of claim 1.

19. The process of claim 1 wherein the hindered amine is 4-amino-2,2,6,6-tetraalkylpiperidine, the polyamide precursors are caprolactam and aminocaproic acid, the hindered amine forms about 0.1 to about 1 weight percent of the substrate, and the temperature is in a range of from about 225° to about 280° C.

20. A nylon 6 fiber made in accordance with the process of claim 19.

21. A nylon 6 fiber made in accordance with the process of claim 19 and characterized by a denier per filament of up to about 20.

22. A polyamide substrate comprising a light stabilizing amount of a hindered amine bound thereto by reaction of a functional group of the hindered amine with an end group of a precursor of said polyamide, said hindered amine being represented by the formula:

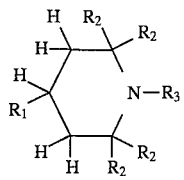

in which
 $R_1$ comprises said functional group which is an amine or an amide-forming group;
 $R_2$ is alkyl; and
 $R_3$ is selected from the group consisting of hydrogen; alkyl of 1 to 3 carbons; and —$OR_4$ in which $R_4$ is selected from the group consisting of hydrogen, methyl, and alkyl of 1 to 7 carbons.

23. The polyamide substrate of claim 21 wherein said polyamide precursor is selected from the group consisting of lactams; monomers and oligomers of a $C_2$ to $C_{18}$ amino acid;

monomers and oligomers of a $C_2$ to $C_{18}$ alkyl diamine with a $C_2$ to $C_{18}$ aliphatic diacid; monomers and oligomers of a $C_2$ to $C_{18}$ alkyl diamine with a $C_8$ to $C_{24}$ aryl diacid or aryl diacid derivative; monomers and oligomers of a $C_6$ to $C_{24}$ aryl diamine with a $C_8$ to $C_{24}$ aryl diacid or aryl diacid derivative; monomers and oligomers of a $C_6$ to $C_{24}$ aryl diamine with a $C_2$ to $C_{18}$ alkyl diacid or alkyl diacid derivative; monomers and oligomers of a $C_8$ to $C_{14}$ aralkyl diamine with a $C_{10}$ to $C_{14}$ aralkyl diacid or diacid derivative; and copolymers thereof.

24. The polyamide substrate of claim 21 wherein said hindered amine is present in the amount of about 0.1 to about 1 weight percent.

25. The polyamide substrate of claim 21 wherein $R_1$ is selected from the group consisting of —(NH)$R_5$ where $R_5$ is hydrogen or alkyl of 1 to 8 carbons; carboxyl; carboxylic acid derivative; —(CH$_2$)$_x$(NH)$R_5$, in which X is an integer of from 1 to about 6 and $R_5$ is hydrogen or alkyl of 1 to 8 carbons; —(CH$_2$)$_Y$COOH, in which Y is an integer of from 1 to about 6; and —(CH$_2$)$_Y$COOH acid derivative in which Y is an integer of from 1 to about 6.

26. The polyamide substrate of claim 24 wherein $R_2$ is a methyl group.

27. The polyamide substrate of claim 24 wherein $R_3$ is —H.

28. The polyamide substrate of claim 24 wherein said hindered amine is 4-amino-2,2,6,6-tetramethylpiperidine.

29. The polyamide substrate of claim 24 wherein said polyamide precursor is selected from the group consisting of lactams; monomers and oligomers of a $C_2$ to $C_{18}$ amino acid; monomers and oligomers of a $C_2$ to $C_{18}$ alkyl diamine with a $C_2$ to $C_{18}$ aliphatic diacid; monomers and oligomers of a $C_2$ to $C_{18}$ alkyl diamine with a $C_8$ to $C_{24}$ aryl diacid or aryl diacid derivative; monomers and oligomers of a $C_6$ to $C_{24}$ aryl diamine with a $C_8$ to $C_{24}$ aryl diacid or aryl diacid derivative; monomers and oligomers of a $C_6$ to $C_{24}$ aryl diamine with a $C_2$ to $C_{18}$ alkyl diacid or alkyl diacid derivative; monomers and oligomers of a $C_8$ to $C_{14}$ aralkyl diamine with a $C_{10}$ to $C_{14}$ aralkyl diacid or diacid derivative; and copolymers thereof.

30. The polyamide substrate of claim 24 wherein said polyamide precursors are caprolactam and aminocaproic acid, the polyamide substrate is nylon 6, and the end groups are carboxyls and amines.

31. The polyamide substrate of claim 24 wherein said polyamide precursor is an aryl diamine with an acid halide; the polyamide substrate is an aramid; and the end groups are selected from the group consisting of carboxylic acid derivatives, amines, and combinations thereof.

32. The polyamide substrate of claim 30 wherein said acid halide is terephthaloyl chloride.

33. The polyamide substrate of claim 24 wherein said polyamide precursor is an aryl diamine salt with an acid halide; the polyamide substrate is an aramid; and the end groups are selected from the group consisting of amine salts, amines, carboxylic acid derivatives, and combinations thereof.

34. The polyamide substrate of claim 32 wherein said acid halide is isophthaloyl chloride.

35. A flag made of the polyamide substrate of claim 21.

36. A decorative banner made of the polyamide substrate of claim 21.

37. A personal flotation device cover made of the polyamide substrate of claim 21.

* * * * *